April 16, 1935.    B. O. UNDERWOOD    1,998,210
COTTON DRYING APPARATUS
Filed Sept. 25, 1933
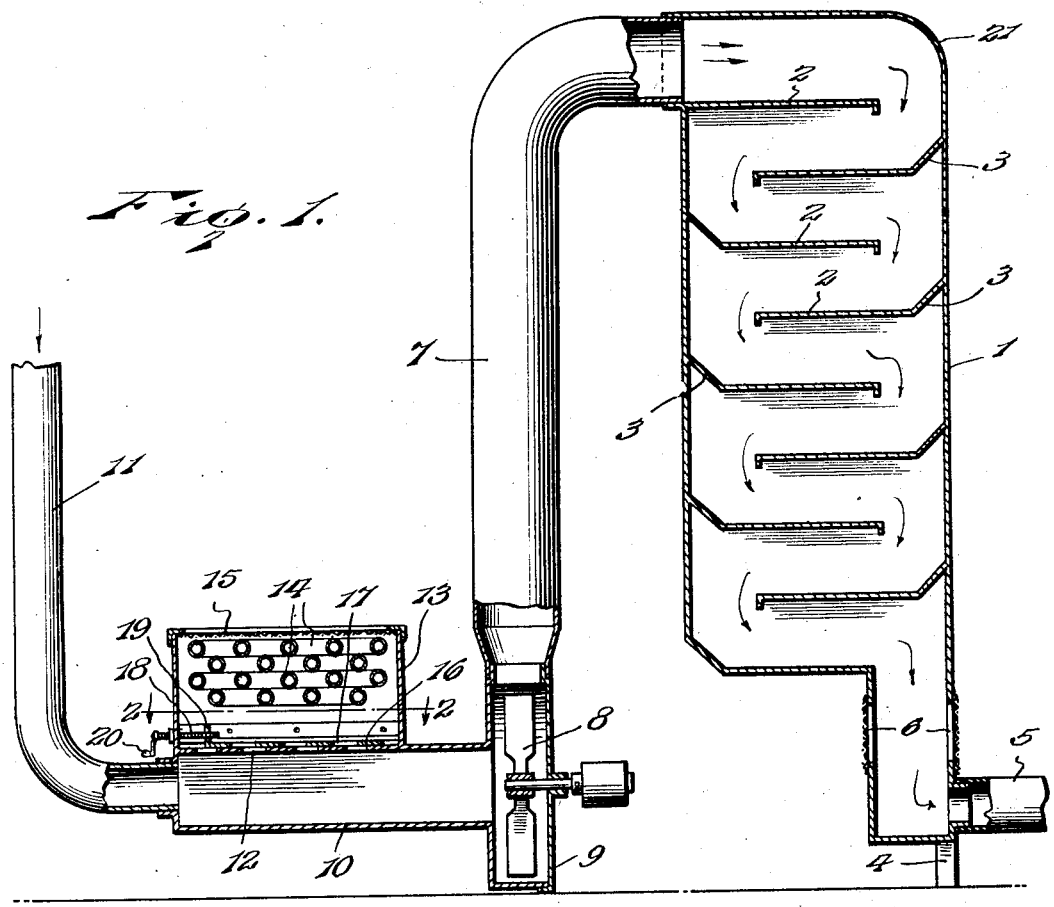
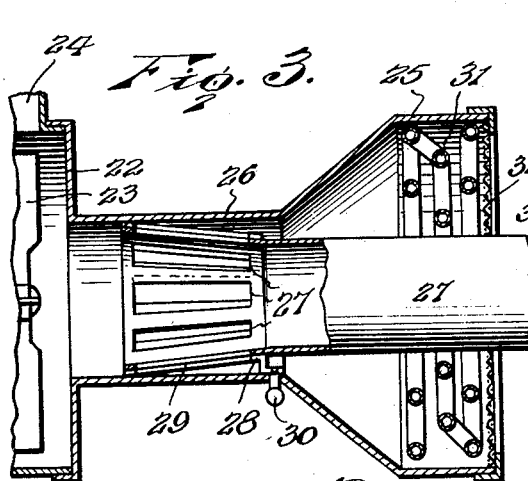
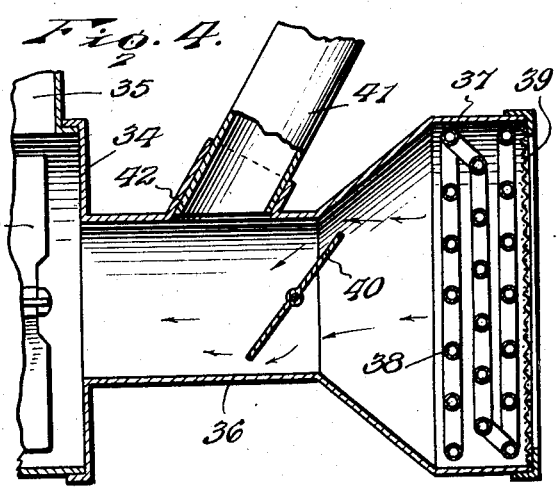
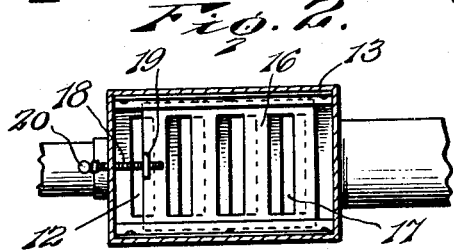
Inventor
B. O. Underwood.
By Lacey & Lacey
Attorneys Patented Apr. 16, 1935

1,998,210

UNITED STATES PATENT OFFICE 1,998,210

COTTON DRYING APPARATUS

Bert O. Underwood, Oklahoma City, Okla., assignor to The Boardman Company, Oklahoma City, Okla., a corporation of Oklahoma Application September 25, 1933, Serial No. 690,892

2 Claims. (Cl. 34—34)

This invention relates to apparatus for drying seed cotton. In order that seed cotton may be effectually cleaned and ginned, it is necessary to first dry the cotton and many attempts have been made to provide apparatus which will successfully perform the drying operation. The most efficient apparatus heretofore produced has been of that type disclosed in Letters Patent No. 1,871,773, granted to Charles A. Bennett, August 16, 1932, in which the seed cotton is drawn through a prescribed path and mixed with hot air, the hot air and cotton being driven into a drying tower through which the cotton is carried by the circulating air in contact with and over a series of baffles or shelves to be eventually discharged at the bottom of the tower. The apparatus heretofore employed has required the use of several fans and conduits or pipes leading from the respective fans to the air heater and to the source of supply of the cotton and, therefore, involves serious expense for installation and operation. It is the object of the present invention to simplify the construction and operation of the apparatus so that the expense of installation and maintenance will be materially reduced without any loss of efficiency in the process. The invention is illustrated in the accompanying drawing and will be hereinafter first fully described and then more particularly pointed out in the appended claims.

In the drawing, Fig. 1 is a view, partly in section and partly in elevation, of an apparatus embodying the present invention, Fig. 2 is a section on the line 2—2 of Fig. 1, Figs. 3 and 4 are detail sections showing slight modifications.

Referring to Fig. 1, the reference numeral 1 designates the drying tower which may be constructed of any suitable material but should be lined with sheet metal, if not constructed of that material, in order that a smooth plane surface will be provided against which the cotton may be deflected and over which it may pass. Within the drying tower, shelves or floors 2 are disposed in spaced relation and these shelves are connected alternately with the opposite sides of the tower by deflectors 3 which are disposed obliquely, as clearly shown, the deflectors and shelves or floors being constructed of sheet metal in order to provide the desired smooth surfaces. The tower may be supported in any convenient manner and a leg is indicated at 4. From the lower end of the tower a conduit 5 extends to a bin or other place of deposit to carry off the dried cotton. This conduit or pipe 5 may lead directly to the cotton gins or into a bin, as may be most practical under any given conditions. Above the outlet conduit 5, screened openings 6 are provided in the sides of the tower to permit escape of the air while preventing escape of the cotton. A supply conduit 7 leads into the tower at the top of the same and the hot air laden with cotton is driven through this conduit by a fan 8 arranged at the lower end or mouth of the conduit and driven by any convenient means. The fan is mounted in a fan casing 9 and is so disposed that the force of the same is exerted in the proper direction to drive the incoming air and cotton up through the conduit 7, as will be understood. Leading into the fan casing 9 is a chamber 10 and delivering into this chamber at the end thereof remote from the fan casing is a suction pipe 11 which may have its free end (not shown) disposed within a storage bin or adapted to be arranged over a load of cotton in a truck. In one side of the chamber 10 are openings 12 and housing said openings is a heating box 13 containing pipes or coils 14 which are in communication with a boiler or other source of heat, one side of the heating box 13 being open and provided with a screen 15 so that outside air may readily enter the box and pass over the pipes or coils 14 to be raised in temperature.

A damper 16 is provided within the heating box 13 and consists of a plate slidably resting upon the wall of the chamber 10 and provided with slots or openings 17 therein corresponding in size, number and spacing to the openings 12, before mentioned. An adjusting screw 18 is swiveled in one end wall of the heating box and is engaged through a bearing lug or nut 19 on the damper, as shown, the screw being equipped externally of the heating box with a handle 20 whereby it may be rotated when desired. By turning the screw 18 in the proper direction, the damper 16 may be readily adjusted so that the openings 12 and 17 may be caused to fully register or be entirely out of register, the volume of air passing into the chamber 10 being thereby nicely regulated.

In operation, the feed pipe 11 is placed in contact with the cotton to be treated and the fan 8 is set in operation, it being understood that steam or other heating agent is circulated through the pipes and coils 14. The rotation of the fan 8 will cause a circulation through the heating box 13 and the feed pipe 11 up through the conduit 7 and into and through the drying tower so that air will be drawn through the heating box over the heating coils and pipes therein and thereby raised in temperature while cotton will be drawn through the feed pipe 11 and will mingle with the heated air in the chamber 10. The cotton-laden air will pass from the conduit 7 into the upper end of the drying tower and will be deflected downwardly past the uppermost shelf or floor 2 by the upper curved corner 21 of the tower. The downward travel of the cotton and air will carry it against the uppermost deflector 3 whereby it will be turned toward the central vertical line of the tower and driven across the shelf leading from said deflector. A tortuous passage downward through the drying tower will thus be imparted to the cotton and, as a result, the cotton will assume a fluffy condition and will be thoroughly dried by its contact with the warm air which will penetrate and circulate through the cotton as it loosens and softens into its fluffy form. The cotton and air will escape at the bottom of the tower as has been stated.

It will be readily noted that by my invention only one fan is needed and the cotton and hot air is drawn into the apparatus by suction from the single fan. I thus eliminate many parts considered necessary in apparatus as heretofore installed so that a very material saving in the cost of installation and operation is effected.

In Fig. 3 I have shown a somewhat different arrangement of the working elements which, however, will operate in substantially the same manner as that previously described. In this figure, the fan casing 22 houses a fan 23 and the conduit 24, for the commingled cotton and hot air, rises from the fan casing in the same manner as the apparatus shown in Fig. 1. The heating box 25 is connected with the side of the fan casing by a tubular housing 26 and the feed pipe 27, through which the cotton to be treated is delivered, passes through the heating box and has its end disposed within the tubular housing 26, as clearly shown, this end of the feed pipe being provided with slots 27 and a damper or valve 28 being rotatably fitted about the end of the pipe and provided with slots or openings 29 which may be caused to cover or uncover the slots or openings 27 in an obvious manner, the valve being equipped with a handle 30 playing through an opening provided therefor in the side of the housing. The damper, of course, in this arrangement, is an annulus fitting closely about the end of the feed pipe and the feed pipe is flared, as shown, so that the extreme edge thereof or of the valve will be in close contact with the wall of the tubular housing 26 while the main body of the pipe and the operating end of the damper or valve will be spaced from the wall of the housing to permit air from the heating box to enter the end of the feed pipe and commingle with and act on the cotton. The heating box contains heating coils 31 substantially the same as the coils 14 in the first-described apparatus and one side of the box is open and provided with a screen 32.

In Fig. 4 is shown a further variation of the invention in which the fan 33 is mounted within a fan casing 34 and the conduit 35 for the cotton-laden hot air rises from the fan casing. A tubular housing 36 leads into the fan casing through one side of the same and a heating box 37 is mounted at the outer end of this housing, said box containing steam coils 38 and having one side open and covered with a screen 39. A butterfly valve or damper 40 is provided in the tubular housing 36 and the feed pipe 41, through which the cotton is delivered, is connected with one side of the housing and leads into the same, as shown at 42, between the fan casing and the damper 40. The apparatus shown in Figs. 3 and 4 will operate in substantially the same manner as the apparatus shown in Fig. 1, the hot air and cotton being drawn to and delivered into the drying tower by a single fan which is located between the tower and the cotton feed pipe and heating box.

Having thus described the invention, I claim:

1. In a cotton-drying apparatus of the type described, a fan, a conduit leading from the fan, a mixing chamber leading into the fan, a cotton feed pipe delivering into said mixing chamber, a heating box having an open side and having its opposite side connected to the mixing chamber, a damper controlling the flow of heat currents through the mixing chamber to the fan, and a heating element in the heating box at the open side of the same.

2. In a cotton-drying apparatus of the type described, a fan, a mixing chamber leading into the fan, a conduit leading from the fan to a stationary drier tower, a cotton feed pipe delivering into the mixing chamber through one side thereof, a heating box connected directly to the mixing chamber immediately adjacent the cotton feed pipe and having an open side, a heating element within said box at the open side of the same, and a damper disposed between the heating element and the fan.

BERT O. UNDERWOOD. [L. S.]